(12) United States Patent
Saito

(10) Patent No.: US 7,047,542 B2
(45) Date of Patent: May 16, 2006

(54) DISC DRIVE APPARATUS AND METHOD OF MANUFACTURING THE SAME

(75) Inventor: Koji Saito, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 118 days.

(21) Appl. No.: 10/744,094

(22) Filed: Dec. 24, 2003

(65) Prior Publication Data
US 2004/0154036 A1 Aug. 5, 2004

(30) Foreign Application Priority Data
Dec. 26, 2002 (JP) .............................. 2002-378647

(51) Int. Cl.
*G11B 17/028* (2006.01)
(52) U.S. Cl. .................................................... 720/697
(58) Field of Classification Search ..................... None
See application file for complete search history.

(56) References Cited

U.S. PATENT DOCUMENTS

| | | | | |
|---|---|---|---|---|
| 4,629,919 A | * | 12/1986 | Merkle | 310/90 |
| 4,871,404 A | * | 10/1989 | Murata et al. | 156/73.1 |
| 4,984,909 A | * | 1/1991 | Shirotori | 384/493 |

FOREIGN PATENT DOCUMENTS

| | | |
|---|---|---|
| JP | 51-44391 | 10/1976 |
| JP | 60-112877 | 6/1985 |
| JP | 63-65113 | 4/1988 |
| JP | 1-75358 | 5/1989 |
| JP | 5-73744 | 10/1993 |
| JP | 3002067 | 7/1994 |
| JP | 63-29369 | 2/1998 |
| JP | 11-176077 | 7/1999 |
| JP | 2001-178078 | 6/2001 |
| JP | 2001-332014 | 11/2001 |

* cited by examiner

*Primary Examiner*—George J. Letscher
(74) *Attorney, Agent, or Firm*—Pillsbury Winthrop Shaw Pittman, LLP

(57) ABSTRACT

A disk drive apparatus includes a turntable having a boss at its one side surface and a rotation center hole, and a rotary shaft inserted and fixed in the hole, an inner circumferential surface of the hole being configured to have a fitting portion near to another side surface of the turntable, a cylindrical clearance near to the one side surface opening in an end of the boss, and a large diametrical portion expanded outward in a radial direction of the hole from the clearance and opening in the end and/or an outer circumferential surface of the boss, the shaft inserted in the hole being fixed to the fitting portion by press fitting and to the clearance and large diametrical portion by adhesive filled in the clearance and large diametrical portion.

20 Claims, 5 Drawing Sheets

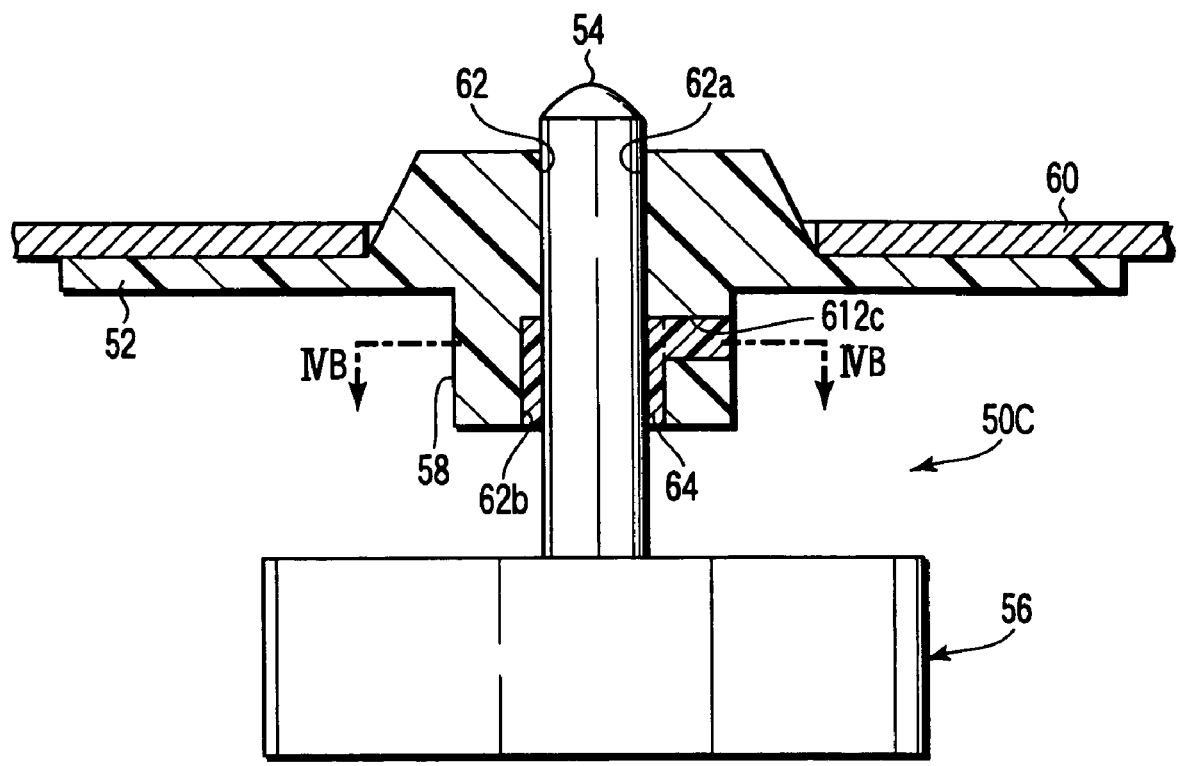
F I G. 4A
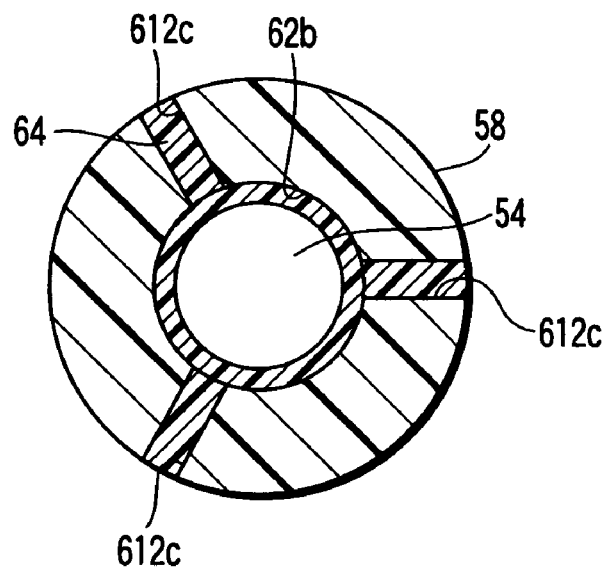
F I G. 4B he rotary shaft which is one of a rotor of an electric motor, and one side surface of the turntable, which faces the rotor of the motor, is fixed by an adhesive to an end surface of the rotor, which faces to the turntable. The adhesive is applied to both of the rotor-facing side surface of the turntable and the turntable-facing end surface of the rotor, at their positions separated outward in the radial direction of the rotary shaft from the rotation centerline of the rotary shaft. In this fixation, the adhesive tends to cause a rotation unbalance of the turntable and motor rotor, and a relatively much amount of adhesive is used for the fixation.

In another conventional disc drive apparatus comprising a turntable fixed to a rotary shaft by a combination of press fitting and adhesive, the turntable has a boss at a center portion of one side surface thereof, and a center hole into which the rotary shaft is inserted and fixed is formed in the boss. Another side surface of the turntable supports concentrically a disc-like optical recording medium, which is one kind of a disc-like medium, such as a CD or a DVD. The rotary shaft is an output shaft of an electric motor.

An end portion of an inner circumferential surface of the rotation center hole of the boss, which is near to another side surface of the turntable, is chamfered conically to act as an adhesive reservoir.

In the above-mentioned another conventional disc drive apparatus, at first the rotary shaft is pressed to fit into the rotation center hole of the boss of the turntable, and then the conical adhesive reservoir is filled with an adhesive to bond the turntable to the rotary shaft.

The adhesion strength is usually weakened as a clearance to be filled with the adhesive between bonded parts (in this conventional apparatus, the conical adhesive reservoir in the inner circumferential surface of the rotation center hole of the boss of the turntable and an outer circumferential surface of the rotary shaft) is increased.

Therefore, in the above mentioned another conventional disc drive apparatus in which the adhesive is filled in the conical adhesive reservoir, the fixation or adhesion strength of the conical adhesive reservoir area of the inner circumferential surface of the rotation center hole of the boss of the turntable to the outer circumferential surface of the rotary shaft is relatively weak against the pressing force, loaded by the damper which presses the center portion of the disc-like optical recording medium supported on another side surface of the turntable, in a direction toward another side surface of the turntable along the rotation centerline of the rotary shaft.

Further, the above mentioned adhesion is also relatively weak against the rotation torque generated between the inner circumferential surface of the rotation center hole of the boss of the turntable and the outer circumferential surface of the rotary shaft by a rotation of the rotary shaft.

In still another conventional disc drive apparatus comprising a turntable fixed to a rotary shaft by a combination of press fitting and adhesive, the turntable has a boss at a center portion of one side surface thereof, and a center hole into which the rotary shaft is inserted and fixed is formed in the boss. Another side surface of the turntable supports concentrically a disc-like optical recording medium, which is one kind of a disc-like medium, such as a CD or a DVD. The rotary shaft is an output shaft of an electric motor.

The above mentioned still another disc drive apparatus is different from the aforementioned another disc drive apparatus in a following point. That is, a cylindrical large diametrical portion extending from the above-mentioned one side surface of the turntable toward another side surface is formed in an inner circumferential surface of the rotation center hole of the boss, and the cylindrical large diametrical

DISC DRIVE APPARATUS AND METHOD OF MANUFACTURING THE SAME

CROSS-REFERENCE TO RELATED APPLICATIONS

This application is based upon and claims the benefit of priority from the prior Japanese Patent Application No. 2002-378647, filed Dec. 26, 2002, the entire contents of which are incorporated herein by reference.

BACKGROUND OF THE INVENTION

1. Field of the Invention

The present invention relates to a disc drive apparatus and a method of manufacturing the same.

2. Description of the Related Art

In recent years, the disc drive apparatus for rotating a disc-like medium has been used, for example in a CD player or a DVD player to rotate a disc-like optical recording medium of one kind of the disc-like medium, such as a CD (compact Disc) or a DVD (Digital Versatile Disc). In the CD player or the DVD player, while the CD or the DVD is being rotated by the disc drive apparatus, recording of signals in a signal-recording layer of the CD or the DVD and/or reproduction of the signals recorded in the signal-recording layer is performed using a light beam.

Such a disc drive apparatus as described above comprises a turntable and a rotary shaft fixed concentrically to the turntable. The turntable has a boss at a center portion of its one side surface. A center hole is formed in the boss, and the rotary shaft is inserted into and fixed in the center hole. Another side surface of the turntable supports concentrically the disc-like optical recording medium, such as the CD or the DVD, which is one kind of the disc-like medium. The rotary shaft is usually an output shaft of an electric motor.

In the above-mentioned disc drive apparatus, it is necessary to rotate the disc-like medium stably and accurately at a high speed. Thus, the disc drive apparatus further comprises a damper that presses a rotation center portion of the disc-like medium, supported concentrically on another side surface of the turntable, downward to another side surface. Therefore, while the turntable is being rotated with the disc-like medium, the boss of the turntable is being subjected to a downward pressing force by the clamper and a rotation torque by the rotary shaft.

Comparing with the disc drive apparatus used in the CD player, the disc drive apparatus used in the DVD player is required to rotate the DVD more stably and accurately at a higher speed. Thus, in the disc drive apparatus in the DVD player, compared with the disc drive apparatus in the CD player, it is necessary to fix the boss of the turntable to the rotary shaft more accurately and securely.

In the conventional disc drive apparatus, the rotation center hole of the boss of the turntable is fixed to the rotary shaft only by press fitting, or by a combination of press fitting and adhesive. The fixation of the rotary center hole only by press fitting, compared with the combination of press fitting and adhesive, is weak in a strength against the above-mentioned rotation torque and pressing force, and this weak strength will be lowered further with time.

A conventional disc drive apparatus, in which a rotation center hole of a boss of a turntable is fixed to a rotary shaft by a combination of press fitting and adhesive, is well known by Japanese Patent Application KOKAI Publication No. 11-176077. In the conventional disc drive apparatus disclosed in this Publication, the turntable is pressed to fit on portion terminates at a position separated from the above-mentioned one side surface of the turntable by a predetermined distance. This cylindrical large diametrical portion acts as an adhesive reservoir.

In this still another conventional disc drive apparatus, before the rotary shaft is pressed to fit into the rotation center hole of the boss of the turntable, an adhesive is applied to an area of an outer circumferential surface of the rotary shaft, that area being to be pressed to fit into the rotation center hole. And, by the above-mentioned press fitting, the adhesive is filled in the cylindrical adhesive reservoir.

In the still another conventional disc drive apparatus configured as described above, a clearance to be filled with the adhesive between the bonding parts (in this conventional apparatus, the cylindrical adhesive reservoir area of the inner circumferential surface of the rotation center hole of the boss of the turntable and the outer circumferential surface of the rotary shaft) is smaller than that of the aforementioned another conventional disc drive apparatus (in the aforementioned another conventional apparatus, the conical adhesive reservoir area of the inner circumferential surface of the rotation center hole of the boss of the turntable and the outer circumferential surface of the rotary shaft).

Therefore, in this still another conventional disc drive apparatus in which the adhesive is filled in the cylindrical adhesive reservoir, compared with the aforementioned another conventional disc drive apparatus in which the adhesive is filled in the conical adhesive reservoir, the adhesion strength of the cylindrical adhesive reservoir area of the inner circumferential surface of the rotation center hole of the boss of the turntable to the outer circumferential surface of the rotary shaft, is strong against the pressing force loaded by the aforementioned damper in the direction toward another side surface of the turntable along the rotation center line of the rotary shaft.

Further, the above mentioned adhesion in the still another conventional disc drive apparatus is also strong against the rotation torque generated by the rotation of the rotary shaft between the inner circumferential surface of the rotation center hole of the boss of the turntable and the outer circumferential surface of the rotary shaft, in comparison with the adhesion in the aforementioned another conventional disc drive apparatus.

However, in this still another conventional disc drive apparatus, when the rotary shaft is pressed into the rotation center hole of the boss of the turntable, an opening of the cylindrical adhesive reservoir in an end surface of the boss tends to be blocked by the adhesive applied to the outer circumferential surface of the rotary shaft. In this case, the air in the adhesive reservoir can not escape from the opening to an external space, and as a result, a part in the adhesive reservoir can not be filled with the adhesive. This result in that the adhesive reservoir area of the inner circumferential surface of the rotation center hole of the boss of the turntable and the outer circumferential surface of the rotary shaft can not be bonded with each other in a desired strength by the adhesive in the adhesive reservoir.

BRIEF SUMMARY OF THE INVENTION

According to an aspect of the present invention, a disc drive apparatus comprises: a turntable which includes one side surface, another side surface, and a boss provided concentrically on the one side surface, the boss having a rotation center hole, and the another side surface configured to support a disc-like medium concentrically; and a rotary shaft which is inserted and fixed in the rotation center hole of the turntable, and rotates the turntable. An area of an inner circumferential surface of the rotation center hole of the boss, which is located near to the another side surface of the turntable, is configured as a fitting portion to which a portion of an outer circumferential surface of the rotary shaft, which corresponds to the another side area of the inner circumferential surface of the rotation center hole when the rotary shaft is inserted in the rotation center hole, is pressed to fit. An area of the inner circumferential surface of the rotation center hole of the boss, which is located near to the one side surface of the turntable, is configured to create a clearance which is detached outward from a portion of the outer circumferential surface of the rotary shaft, which corresponds to one side area of the inner circumferential surface of the rotation center hole when the rotary shaft is inserted in the rotation center hole, in a radial direction of the rotation center hole by a predetermined distance, the clearance being continued in a circumferential direction of the rotation center hole along the one side portion of the outer circumference surface. A large diametrical portion is formed in at least one part of the one side area of the inner circumferential surface of the rotation center hole, the large diametrical portion being expanded more outward in the radial direction of the rotation center hole than the clearance and opened to an outside space. And, an adhesive is filled in the clearance and the large diametrical portion.

According to another aspect of the present invention, a method of manufacturing the above described disc drive apparatus comprises: applying an adhesive to an area of the outer circumferential surface of the rotary shaft, the area being to be inserted and fixed in the rotation center hole of the boss of the turntable; and inserting the area of the rotary shaft to be inserted and fixed into the rotation center hole of the boss of the turntable. The adhesive applied to the area of the rotary shaft to be inserted and fixed is pressed by a boundary between the fitting portion and the clearance in the inner circumferential surface of the rotation center hole of the boss, when the area of the rotary shaft to be inserted and fixed is inserted into the rotation center hole of the boss of the turntable. The pressed adhesive escapes air in the clearance to an outside space from the large diametrical portion, spreads to the whole of the clearance, and fills the whole of the clearance. The adhesive spreading in the clearance flows from the clearance into the large diametrical portion, and fills the large diametrical portion. And, after the insertion of the rotary shaft into the rotation center hole of the boss, the rotary shaft is fit in the fitting part of the inner circumferential surface of the rotation center hole of the boss of the turntable, and the clearance and large diametrical portion of the inner circumferential surface of the rotation center hole is bonded to the rotary shaft by the adhesive filled in the clearance and large diametrical portion.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

FIG. 4A is a schematic vertical sectional view of a disc drive apparatus according to a third embodiment of the present invention;

FIG. 4B is a horizontal cross sectional view taken along a line of IVB—IVB in FIG. 4A;

DETAILED DESCRIPTION OF THE INVENTION

Figure 1A:
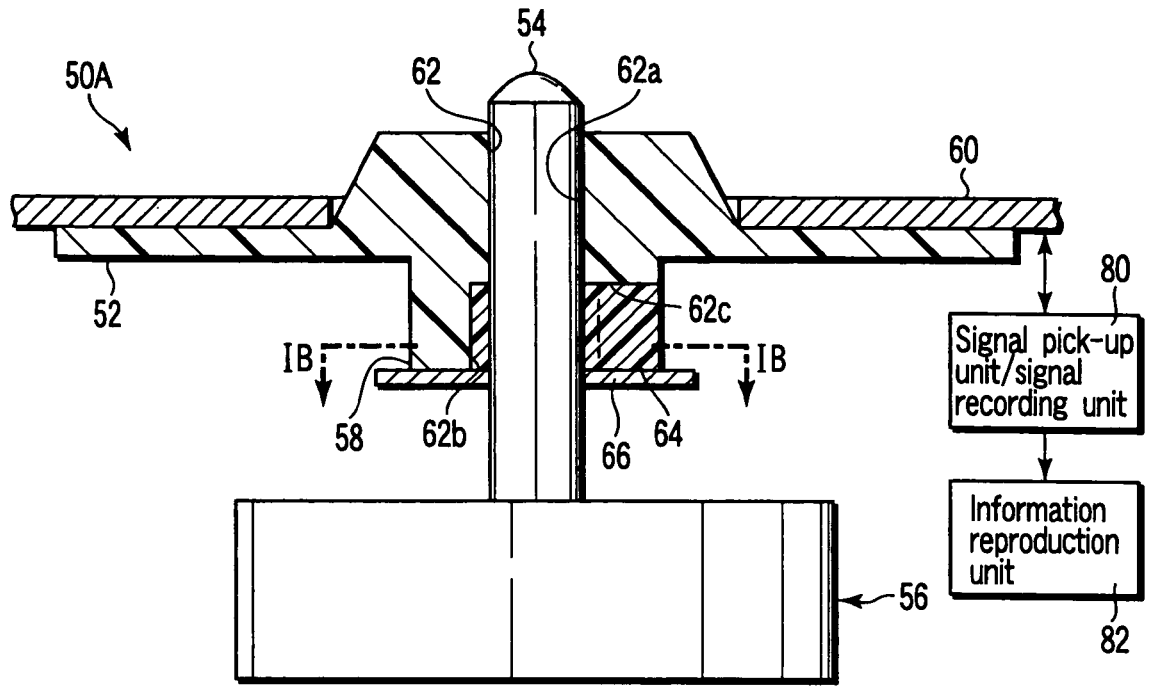
FIG. 1A is a schematic vertical sectional view of a disc drive apparatus according to a first embodiment of the present invention.

Now, a disc drive apparatus 50A according to a first embodiment of the present invention will be explained with reference to FIGS. 1A and 1B.

The disc drive apparatus 50A has a turntable 52, and a rotary shaft 54, which is fixed concentrically to the turntable 52 and rotates the turntable 52. The rotary shaft 54 is an output shaft of an electric motor 56.

The turntable 52 includes one side surface on which a boss 58 is provided concentrically, and another side surface configured to support a disc-like medium 60 concentrically. A rotation center hole 62 to which the rotary shaft 54 is to be inserted and fixed is formed in the center of the boss 58.

When the rotary shaft 54 rotates the turntable 52 and the disc-like medium 60 on the another side surface of the turntable 52 is rotated, a not-shown damper moves downward in FIG. 1A and presses a center portion of the disc-like medium 60 onto the another side surface. The clamper, which presses the center portion of the disc-like medium 60, can rotate freely, and rotates together with the disc-like medium 60 and the turntable 52.

In this embodiment, the disc-like recording medium 60 is a DVD (Digital Versatile Disc), which is a kind of a disc-like optical recording medium, but according to the concept of the present invention, it can also be a CD (Compact Disc).

That is, the disc drive apparatus 50A of this embodiment comprises a disc-like optical recording medium rotation unit, which includes the turntable 52 and the rotary shaft 54.

An area of an inner circumferential surface of the rotation center hole 62 of the boss 58, which is located near to the another side surface of the turntable 52, is configured as a fitting part 62a to which a portion of the outer circumferential surface of the rotary shaft 54, which corresponds to the another side area of the inner circumference surface of the rotation center hole 62 of the boss 58 when the rotary shaft 54 is inserted into the rotation center hole 62, is fitted by press fitting. An area of the inner circumferential surface of the rotation center hole 62 of the boss 58, which is located near to the one side surface of the turntable 52, is configured to create a clearance 62b which is detached outward from a portion of the outer circumferential surface of the rotary shaft 54, which corresponds to the one side area of the inner circumference surface of the rotation center hole 62 of the boss 58 when the rotary shaft 54 is inserted into the rotation center hole 62, in a radial direction of the rotation center hole 62 by a predetermined distance. The cylindrical clearance 62b continues in a circumferential direction of the rotation center hole 62 along the one side portion of the outer circumferential surface of the rotary shaft 54 while the rotary shaft 54 is inserted into the rotation center hole 62.

A large diametrical portion 62c is formed in at least one part of the one side area of the inner circumference surface of the rotation center hole 62. The large diametrical portion 62c expands more outward in the radial direction than the clearance 62b, and opens to an outside space. An adhesive 64 is filled in the clearance 62b and the large diametrical portion 62c.

The boss 58 has a projecting end surface projecting in a direction directing away from the one side surface of the turntable 52, and an outer circumferential surface facing outward in the radial direction of the rotation center hole 62.

In this embodiment, the inner circumferential surface of the clearance 62b is detached outward from the portion of the outer circumference surface of the rotary shaft 54, the portion corresponding to the clearance 62b while the rotary shaft 54 is inserted into the rotation center hole 62, in the radial direction by about 50 microns. And, the large diametrical portion 62c has a slit shape, which expands in the radial direction and in a direction along a longitudinal centerline of the rotation center hole 62. And, the slit-shaped large diametrical portion 62c penetrates from the inner circumferential surface of the clearance 62b to the outer circumferential surface of the boss 58, and also opens in the projecting end surface of the boss 58.

Figure 1B:
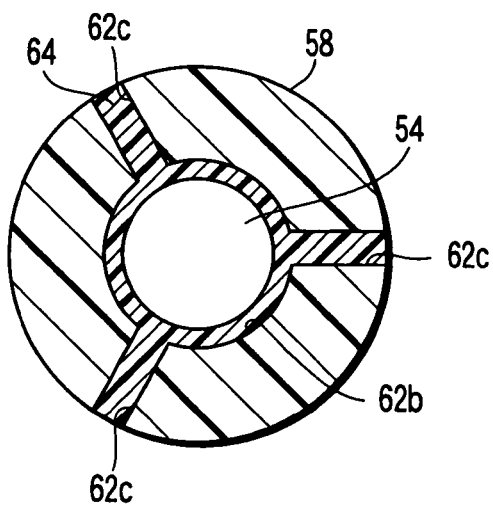
FIG. 1B is a horizontal cross sectional view taken along a line of IB—IB in FIG. 1A.

In this embodiment, the boss 58 has a plurality of slit-shaped large diametrical portions 62c, and the slit-shaped large diametrical portions 62c are disposed at a plurality of positions separated at equal intervals, 120° in this embodiment, in the circumferential direction in the one side area of the inner circumferential surface of the rotation center hole 62, or in the inner circumferential surface of the clearance 62b, as shown well in FIG. 1B. The adhesive 64 is preferably a quick bonding adhesive or an ultraviolet-curing adhesive, and more preferably, an UV-curing adhesive in this embodiment. An example of the UV-curing adhesive is the product name "TB1773 Series" of THREEBOND CO., LTD. in JAPAN.

Though the inner circumferential surface of the clearance 62b is detached from the clearance corresponding portion of the outer circumference surface of the rotary shaft 54 with very small distance as described above, when the adhesive 64 is filled in the clearance 62b, the adhesive 64 overflows from the clearance 62b into the slit-shaped large diametrical portions 62c, and air in the clearance 62b is forced out to the outside space through the slit-shaped large diametrical portions 62c. As a result, the adhesive 64 filled in the clearance 62b is surely and completely filled in the whole of the clearance 62b and the slit-shaped large diametrical portions 62c.

After being surely and completely filled and cured or hardened in the clearance 62 and the slit-shaped large diametrical portions 62c, the adhesive 64 bonds the whole of the inner circumferential surface of the clearance 62 firmly to the outer circumferential surface of the rotary shaft 54 with very narrow distance as described above.

Therefore, even if the disc drive apparatus 50A of this embodiment is used for a long period, the fixation of the inner circumferential surface of the rotation center hole 62 of the boss 58 of the turntable 52 to the outer circumferential surface of the rotary shaft 54 (more specifically, the fitting by the fitting portion 62a and the bonding by the adhesive 64 in the clearance 62b) will not be deteriorated by a pressure applied by the above-mentioned not-shown damper in a direction along a rotation centerline of the rotary shaft 54, and by a rotation torque of the rotary shaft 54.

Since the UV-curing adhesive is used as the adhesive 64 as described above and the slit-shaped large diametrical portions 62c communicated with the clearance 62b open not only in the projecting end surface of the boss 58 but also in the outer circumferential surface of the boss 58, it is possible to cure or harden easily the adhesive 64 in the large diametrical portions 62c by an ultraviolet radiation device, and also to cure or harden easily the adhesive 64 in the clearance 62b through the large diametrical portions 62c, within a short time.

The adhesive 64 filled completely in the very narrow clearance 62 which is adjacent to the outer circumference surface of the rotary shaft 54 and continues in the circumferential direction of the outer circumferential surface of the rotary shaft 54, and also filled completely in at least one of the large diametrical portion 62c (in this embodiment, the plurality of large diametrical portions 62c arranged at the plurality of positions at equal intervals in the circumferential direction) which extends outward from the clearance 62 in the radial direction of the rotary shaft 54, will not make the rotation of the rotary shaft 54 and turntable 52 being unbalanced even if the rotary shaft 54 and turntable 52 rotates at a high speed.

In this embodiment, a turntable-seating member 66 is provided on the outer circumferential surface of the rotary shaft 54. The turntable-seating member 66 faces the projecting end surface of the boss 58 while the rotary shaft 54 is inserted and fixed in the rotation center hole 62 of the boss 58 of the turntable 52. The turntable-seating member 66 is fixed concentrically on the outer circumferential surface of the rotary shaft 54, and is configured as a circular-ring shaped washer made of, for example polyethylene terephthalate (PET).

The turntable-seating member 66 closes the opening of the clearance 62b and the opening of the large diametrical portions 62c in the projecting end surface of the boss 52, and is bonded to the adhesive 64 exposed in these openings.

Such s turntable-seating member 66 as described above reinforces further the fixation of the rotary shaft 54 to the turntable 52 by the adhesive 64.

Next, a method of manufacturing the disc drive apparatus 50A shown in FIGS. 1A and 1B and mentioned above will be described in detail with reference to FIGS. 2A, 2B, 2C, and 2D.

Figure 2A:
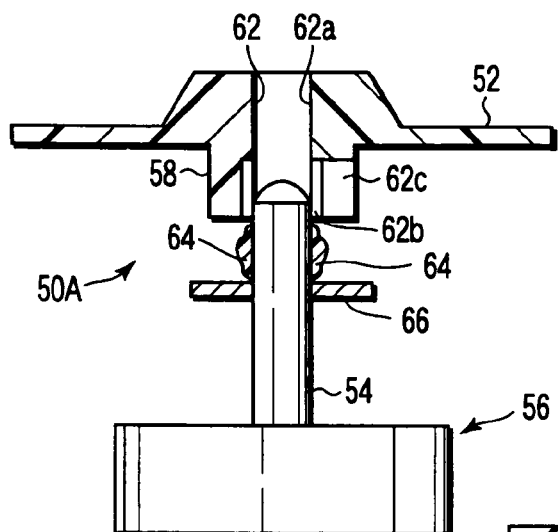
FIGS. 2A, 2B, 2C and 2D are vertical sectional views showing sequentially and schematically a plurality of steps in a method of manufacturing the disc drive apparatus shown in FIGS. 1A and 1B.

In this manufacturing method, before the rotary shaft 54 is inserted and fixed in the rotation center hole 62 of the boss 58 of the turntable 52, the turntable-seating member 66 is concentrically and temporarily fixed at a position on the outer circumferential surface of the rotary shaft 54 as shown in FIG. 2A, the position being a little closer to a projecting end of the rotary shaft 54 than to an end of an area of the outer circumference surface of the rotary shaft, the area being to be inserted in and fixed to the rotation center hole 62 of the boss 58, and the end being opposite to the projecting end of the rotary shaft 54.

In this embodiment, since the turntable-seating member 66 is configured as a circular-ring shaped washer made of, for example polyethylene terephthalate (PET), as above described, the above-mentioned temporarily fixation can be performed by pressing and fitting the rotary shaft 54 into a center hole of the turntable-seating member 66.

In the above-mentioned manufacturing method, a predetermined amount of adhesive 64, an UV-curing adhesive in this embodiment as mentioned above, is applied to the area of the outer circumferential surface of the rotary shaft 54 which is to be inserted and fixed in the rotation center hole 62 of the boss 58, as shown in FIG. 2A. In this embodiment, the turntable-seating member 66 surely prevents the adhesive 64 applied as mentioned above from flowing along the outer circumference surface of the rotary shaft 54 toward a base end of the rotary shaft 54, before the adhesive 64 is cured or hardened.

Next, in the above-mentioned manufacturing method, an end of the rotation center hole 62 of the boss 58 of the turntable 52, the end being at the projecting end of the boss 58, is concentrically placed at the projecting end of the rotary shaft 54, as shown in FIG. 2A. Then, the turntable 52 is pushed to come close to the turntable-seating member 66 on the outer circumference surface of the rotary shaft 54.

Figure 2B:
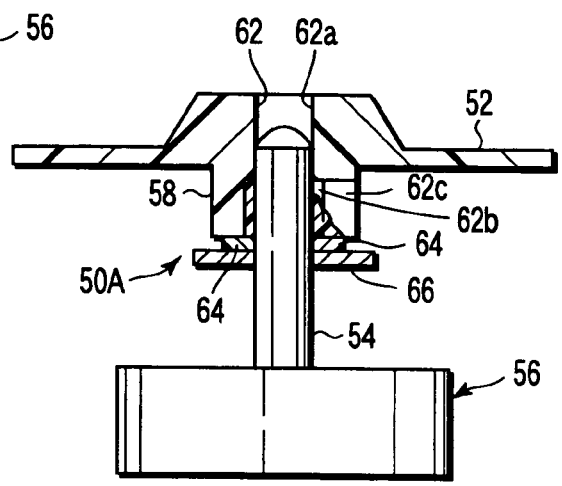

While the projecting end of the rotary shaft 54 is passing through the clearance 62b of the rotation center hole 62 of the boss 58, the adhesive 64 on the outer circumference of the rotary shaft 54 flows into the clearance 62b, as shown in FIG. 2B, and, at the same time, escapes the air in the clearance 62b toward the outside space through the plurality of large diametrical portions 62c. And, as shown in FIG. 2B, while the projecting end of the rotary shaft 54 is pressed into the fitting portion 62a of the rotation center hole 62 of the boss 58, the adhesive 64 completely escapes the air out of the clearance 62b, and is completely filled in the clearance 62b, and further the adhesive flows into the plurality of large diametrical portions 62c with escaping the air in the plurality of large diametrical portions 62c to the outside space.

When a distance between the projecting/end surface of the boss 58 and the turntable-seating member 66 becomes small, the adhesive 64, which is remained on the outer circumference surface of the rotary shaft 54 between the turntable-seating member 66 and the projecting end surface of the boss 58, is spread outward in the radial direction of the rotary shaft 54 between them.

Figure 2C:
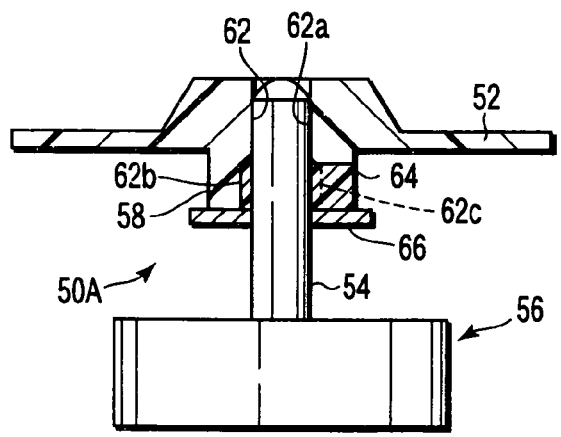
Figure 2D:
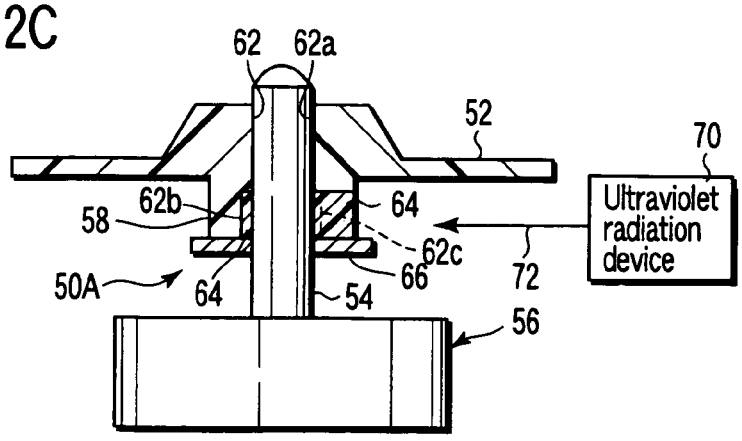

The turntable 52 is being pressed still after the projecting end surface of the boss 58 reaches the turntable-seating member 66, as shown in FIG. 2C. This pressing is stopped, when the projecting end surface of the boss 58, together with the turntable-seating member 66, reaches the end of the inserted and fixed area on the outer circumferential surface of the rotary shaft 54, the end opposing to the projecting end of the rotary shaft 54, as shown in FIG. 2D. In this time, the rotary shaft 54 is tightly fit in the fitting portion 62a of the rotation center hole 62 of the boss 58, and the clearance 62b and plurality of large diametrical portions 62c of the rotary center hole 62 are completely filled with the adhesive 64 with no residual air. Further, the turntable-seating member 66 and the projecting end surface of the boss 58 are in close contact with each other through a very thin film of the adhesive 64. This means that each of the openings of the clearance 62b and the plurality of large diametrical portions 62c in the projecting end surface of the boss 58 is closed by the turntable-seating member 66.

Thereafter, the excess amount of the adhesive 64 extruded onto the outer circumferential surface of the boss 58 from the plurality of large diametrical portions 62c and/or from the clearance between the projecting end surface of the boss 58 and the turntable-seating member 66, is removed by a not-shown and known residual adhesive removing means, such as a not-shown residual adhesive removing member which is pressed on the outer circumferential surface of the boss 58 or such as a not-shown residual adhesive removing gas blown to the outer circumferential surface, while the turntable 52 is rotated together with the rotary shaft 54.

Next, in this embodiment, an ultraviolet radiation device 70 emits ultraviolet ray 72 toward the outer circumferential surface of the boss 58, as shown in FIG. 2D.

The ultraviolet ray 72 radiated as described above penetrates into the adhesive 64 in the plurality of large diametrical portions 62c and clearance 62b through the openings of the plurality of large diametrical portions 62c in the outer circumferential surface of the boss 58, and cures or hardens easily and quickly the adhesive 64 in the plurality of large diametrical portions 62c and clearance 62b. The cured and hardened adhesive 64 bonds the inner circumferential surface of the clearance 62b of the rotation center hole 62 of the boss 58 firmly to a portion of the inserted and fixed area on the outer circumference surface of the rotary shaft 54, the portion corresponding to the clearance 62b, and further bonds the inner surface of the plurality of large diametrical portions 62c firmly to the clearance corresponding portion of the inserted and fixed area on the outer circumference surface of the rotary shaft 54. The cured or hardened adhesive 64 further bonds the turntable-seating member 66 firmly to the projecting end surface of the boss 58 at each of the openings of the plurality of large diametrical portions 62c and the clearance 62d in the projecting end surface of the boss 58, and between the projecting end surface of the boss 58 and the turntable-seating member 66.

The excess amount of the adhesive 64 extruded onto the outer circumferential surface of the boss 58 from the plurality of large diametrical portions 62c and/or the clearance between the plurality of large diametrical portions 62c and the turntable-seating member 66, can also be removed by a not-shown and known residual adhesive removing member pressed on the outer circumferential surface of the boss 58, while the turntable 52 is rotated together with the rotary shaft 54, after the adhesive 64 is hardened, instead of being removed before the adhesive 64 is cured or hardened as described above.

Of course, in this embodiment, it is possible to use an ordinary adhesive or quick bonding adhesive as the adhesive 64, instead of the UV-curing adhesive.

Figure 3A:
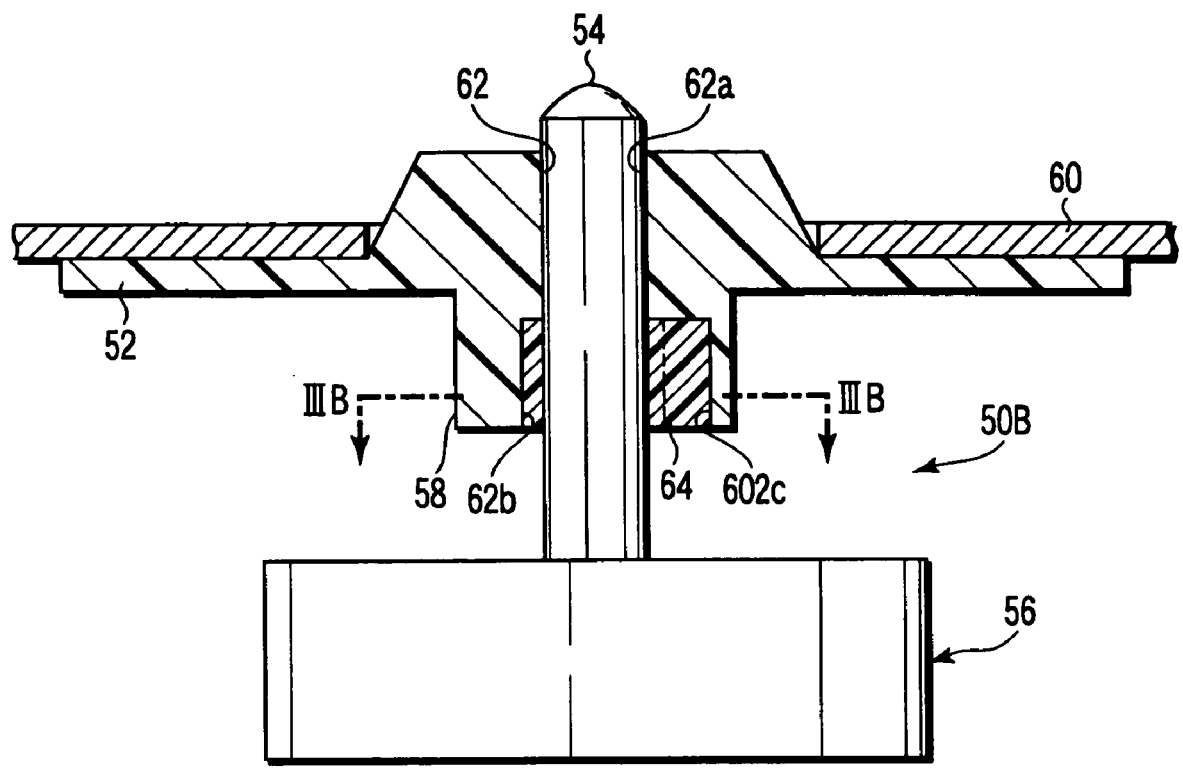
FIG. 3A is a schematic vertical sectional view of a disc drive apparatus according to a second embodiment of the present invention.
Figure 3B:
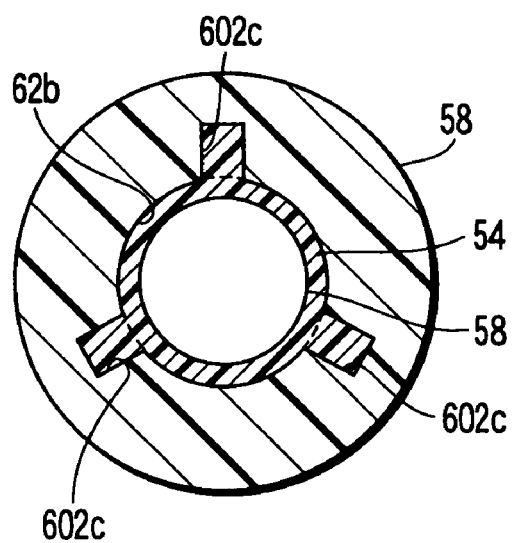
FIG. 3B is a horizontal cross sectional view taken along a line of IIIB—IIIB in FIG. 3A.

Next, a disc drive apparatus 50B according to a second embodiment of the present invention will be described in detail with reference to FIGS. 3A and 3B. In the disc drive apparatus 50B according to the second embodiment of the present invention, the same components as those in the disc drive apparatus 50A according to the first embodiment described above with reference to FIGS. 1A and 1B are denoted by the same reference numerals as those denoting the components of the disc drive apparatus 50A corresponding to those of the disc drive apparatus 50B, and a detailed explanation thereof will be omitted.

The disc drive apparatus 50B according to the second embodiment is different from the disc drive apparatus 50A according to the first embodiment in a structure of a large diametrical portion 602c which expands outward in the radial direction of the rotation center hole 62 in at least a part of the inner circumference surface of the clearance 62b of the rotation center hole 62 of the boss 58 of the turntable 52. Also, in the disc drive apparatus 50B, a plurality of large diametrical portions 602c are provided at a plurality of positions separated at equal intervals, at three positions separated by 120° in this embodiment as shown in FIG. 3B, in the circumferential direction of the rotation center hole 62 in the inner circumferential surface of the clearance 62b, but each of the plurality of large diametrical portions 602c opens only in the projecting end surface of the boss 58 and does not open in the outer circumferential surface of the boss 58, as shown in FIG. 3A. Therefore, in the boss 58 of the turntable 52 of the disc drive apparatus 50B according to the second embodiment, parts located between the outer ends of the large diametrical portions 602c in the radial direction of the rotation center hole 62 and the outer circumferential surface of the boss 58 continues in the circumferential direction.

The large diametrical portions 602c configured as described above increases the strength of the boss 52, compared with the plurality of large diametrical portions 62c in the boss 52 of the disc drive apparatus 50A according to the first embodiment in which the large diametrical portions 62c open in the projecting end face of the boss 52 and further penetrate up to the outer circumferential surface thereof.

In the disc drive apparatus 50B of the second embodiment, each of the plurality of large diametrical portions 602c and the clearance 62b opens only in the projecting end surface of the boss 58. Therefore, when the UV-curing adhesive is used as the adhesive 64 in the disc drive apparatus 50B of the second embodiment, the opening of each of the plurality of large diametrical portions 602c and the clearance 62b in the projecting end surface of the boss 58 must be exposed to the outside space for UV radiation, so that the turntable-seating member 66 as shown in FIG. 1A is not used, as shown in FIG. 3A.

When the ordinary adhesive or quick bonding adhesive is used as the adhesive 64 in the disc drive apparatus 50B of the second embodiment, it is possible to use the turntable-seating member 66 as shown in FIG. 1A.

In a method of manufacturing the disc drive apparatus 50B of the second embodiment as described above, when the rotation center hole 62 of the boss 58 of the turntable 52 is fit on the area of the outer circumference surface of the rotary shaft 54, the area being to be inserted and fixed in the rotation center hole 62, the predetermined amount of adhesive 64, which has being applied on the area of the outer circumferential surface of the rotary shaft 54, flows into the clearance 62b of the rotation center hole 62 and escapes out the air in the clearance 62b to the outside space from the openings of the plurality of large diametrical portions 602c in the projecting end surface of the boss 58 through the plurality of large diametrical portions 602c, and is filled in the clearance 62b with no residual air. Further, the adhesive 64 flowing into the plurality of large diametrical portions 602c from the clearance 62b escapes out the air in the plurality of large diametrical portions 602c to the outside space from the openings of the plurality of large diametrical portions 602c in the projecting end surface of the boss 58, and is further filled in the plurality of large diametrical portions 602c with no residual air.

After the fitting of the rotation center hole 62 of the boss 58 of the turntable 52 to the aforementioned area of the outer circumferential surface of the rotary shaft 54, a part of the adhesive 64 remains on the outer circumferential surface of the rotary shaft 54 and/or a part of the adhesive 64 overflows to the outside from the openings of the plurality of large diametrical portions 602c and the clearance 62b in the projecting end surface of the boss 58. These remained and/or overflowed adhesive 64 can be removed by pressing a not-shown and known residual adhesive removing member or by blowing not-shown and known residual adhesive removing gas to the projecting end surface of the boss 58 and an area of the outer circumferential surface of the rotary shaft 54, the area being adjacent to the projecting end surface of the boss 58, while the turntable 52 is being rotated together with the rotary shaft 54.

Next, a disc drive apparatus 50C according to a third embodiment of the present invention will be described in detail with reference to FIGS. 4A and 4B. In the disc drive apparatus 50C according to the third embodiment of the present invention, the same components as those in the disc drive apparatus 50A according to the first embodiment described above with reference to FIGS. 1A and 1B are denoted by the same reference numerals as those denoting the components of the disc drive apparatus 50A corresponding to those of the disc drive apparatus 50C, and a detailed explanation thereof will be omitted.

The disc drive apparatus 50C according to the third embodiment is different from the disc drive apparatus 50A according to the first embodiment in a structure of a large diametrical portion 612c which expands outward in the radial direction of the rotation center hole 62 in at least a part of the inner circumferential surface of the clearance 62b of the rotation center hole 62 of the boss 58 of the turntable 52. Also, in the disc drive apparatus 50C, a plurality of the large diametrical portions 612c are provided at a plurality of positions separated at equal intervals, at three positions separated by 120° in this embodiment as shown in FIG. 4B, in the circumferential direction of the rotation center hole 62 in the inner circumferential surface of the clearance 62b, but each of the plurality of large diametrical portions 612c opens only in the outer circumferential surface of the boss 58 and does not open in the projecting end surface of the boss 58, as shown in FIG. 4A. Therefore, in the boss 58 of the turntable 52 of the disc drive apparatus 50C according to the third embodiment, a part located between the plurality of large diametrical portions 612c and the projecting end surface of the boss 58 in a direction along the longitudinal center line of the rotation center hole 62 continues in the circumference direction.

The large diametrical portions 612c configured as described above increases the strength of the boss 52, compared with the plurality of large diametrical portions 62c in the boss 52 of the disc drive apparatus 50A according to the first embodiment in which the plurality of large diametrical portions 62c open in the projecting end surface of the boss 52 and further penetrate up to the outer circumferential surface thereof.

In a method of manufacturing the disc drive apparatus 50C of the third embodiment as described above, when the rotation center hole 62 of the boss 58 of the turntable 52 is fit on the area of the outer circumference surface of the rotary shaft 54, the area being to be inserted and fixed in the rotation center hole 62, the predetermined amount of adhesive 64, which has being applied on the area of the outer circumferential surface of the rotary shaft 54, flows into the clearance 62b of the rotation center hole 62 and escapes out the air in the clearance 62b to the outside space from the openings of the plurality of large diametrical portions 612c in the outer circumferential surface of the boss 58 through the plurality of large diametrical portions 612c, and is filled in the clearance 62b with no residual air. Further, the adhesive 64 flowing into the plurality of large diametrical portions 612c from the clearance 62b escapes out the air in the plurality of large diametrical portions 612c to the outside space from the openings of the plurality of large diametrical portions 612c in the outer circumferential surface of the boss 58, and is further filled in the plurality of large diametrical portions 612c with no residual air.

After the fitting of the rotation center hole 62 of the boss 58 of the turntable 52 to the aforementioned area of the outer circumferential surface of the rotary shaft 54, a part of the adhesive 64 remains on the outer circumferential surface of the rotary shaft 54 and/or a part of the adhesive 64 overflows to the outside from the openings of the plurality of large diametrical portions 612c and the clearance 62b in the outer circumferential surface of the boss 58. These remained and/or overflowed adhesive 64 can be removed by pressing a not-shown and known residual adhesive removing member or by blowing not-shown and known residual adhesive removing gas to the outer circumferential surface of the boss 58 and an area of the outer circumferential surface of the rotary shaft 54, the area being adjacent to the projecting end surface of the boss 58, while the turntable 52 is being rotated together with the rotary shaft 54.

In the disc drive apparatus 50C of the third embodiment, each of the plurality of large diametrical portions 612c opens only in the outer circumferential surface of the boss 58. Therefore, when the UV-curing adhesive is used as the adhesive 64 in the disc drive apparatus 50C of the third embodiment, as in the case of the aforementioned first embodiment, the ultraviolet radiation device 70 (refer to FIG. 2D) can radiate the ultraviolet ray 72 toward the outer circumferential surface of the boss 58 from the outside space in the radial direction of the boss 58, and the ultraviolet ray 72 can be easily penetrated into the adhesive 64 filled in the plurality of large diametrical portions 612c and the clearance 62b in the boss 58 through the openings of the plurality of large diametrical portions 612c in the outer circumferential surface of the boss 58, and the adhesive 64 filled in the plurality of large diametrical portions 612c and the clearance 62b in the boss 58 can be quickly cured or hardened.

And, also, in the disc drive apparatus 50C of the third embodiment, as in the disc drive apparatus 50A of the aforementioned first embodiment, it is possible to use the turntable-seating member 66 (refer to FIG. 1A) contacting the projecting end surface of the boss 58.

Of course, in this embodiment, it is possible to use the ordinary adhesive or quick bonding adhesive as the adhesive 64, instead of the UV-curing adhesive.

Figure 5A:
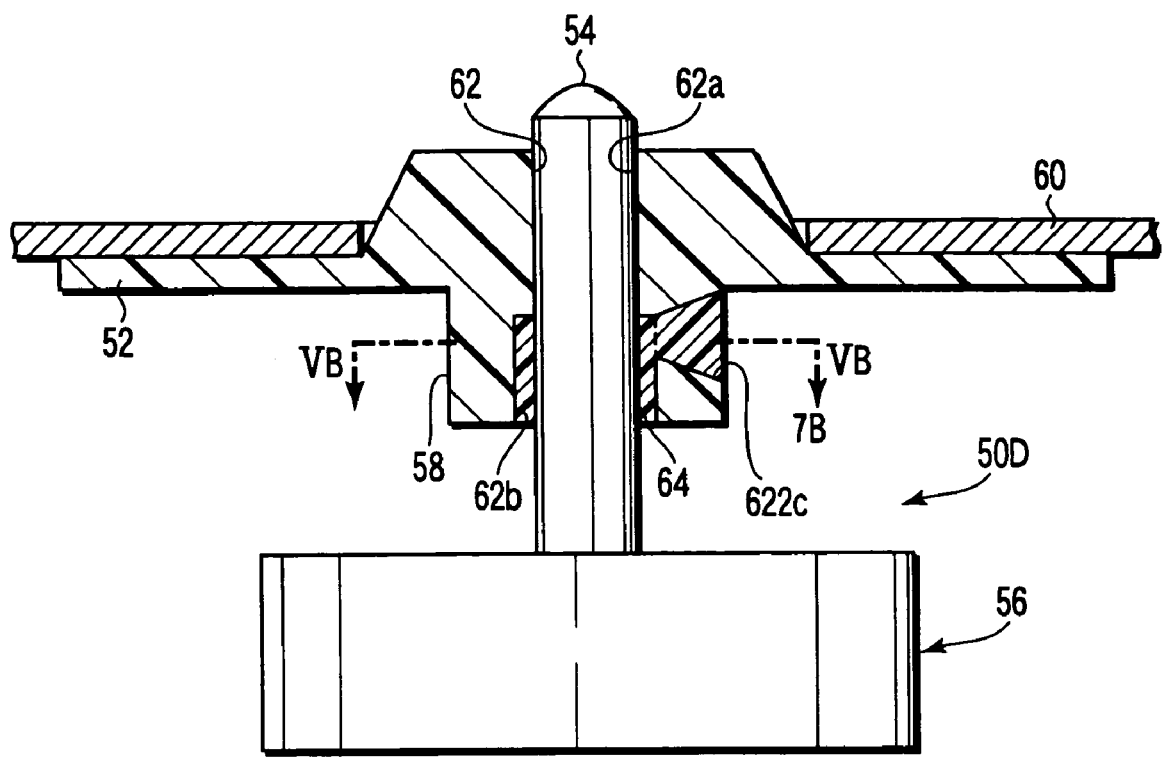
FIG. 5A is a schematic vertical sectional view of a disc drive apparatus according to a fourth embodiment of the present invention.
Figure 5B:
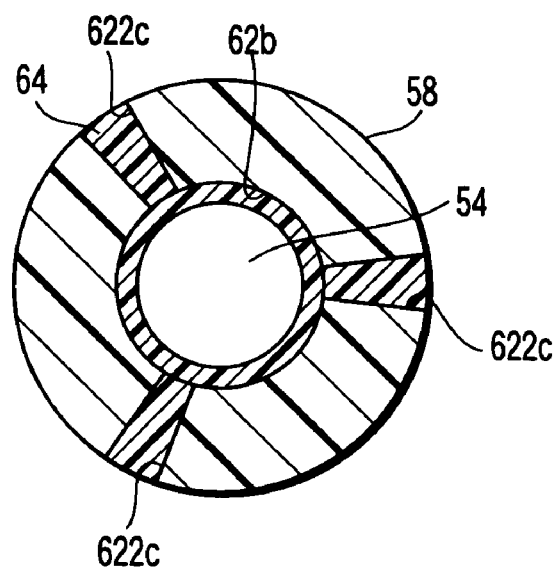
FIG. 5B is a horizontal cross sectional view taken along a line of VB—VB in FIG. 4A.

Next, a disc drive apparatus 50D according to a fourth embodiment of the present invention will be described in detail with reference to FIGS. 5A and 5B. In the disc drive apparatus 50D according to the fourth embodiment of the present invention, the same components as those in the disc drive apparatus 50A according to the first embodiment described above with reference to FIGS. 1A and 1B are denoted by the same reference numerals as those denoting the components of the disc drive apparatus 50A corresponding to those of the disc drive apparatus 50D, and a detailed explanation thereof will be omitted.

The disc drive apparatus 50D according to the fourth embodiment is different from the disc drive apparatus 50A according to the first embodiment in a structure of a large diametrical portion 622c which expands outward in the radial direction of the rotation center hole 62 in at least a part of the inner circumferential surface of the clearance 62b of the rotation center hole 62 of the boss 58 of the turntable 52. Also, in the disc drive apparatus 50D, a plurality of the large diametrical portions 622c are provided at a plurality of positions separated at equal intervals, at three positions separated by 120° in this embodiment as shown in FIG. 5B, in the circumferential direction of the rotation center hole 62 in the inner circumferential surface of the clearance 62b, but each of the plurality of large diametrical portions 622c opens only in the outer circumferential surface of the boss 58 and does not open in the projecting end surface of the boss 58, as shown in FIG. 5A. In addition, each of the plurality of large diametrical portions 622c increases its cross section, for example conically, while each large diametrical portion 622c expands outward from the inner circumferential surface of the clearance 62b to the outer circumferential surface of the boss 58 in the radial direction of the rotation center hole 62. Therefore, in the boss 58 of the turntable 52 of the disc drive apparatus 50D according to the fourth embodiment, a part located between the plurality of large diametrical portions 622c and the projecting end surface of the boss 58 in the direction along the longitudinal center line of the rotation center hole 62 continues in the circumference direction.

The large diametrical portions 622c configured as described above increases the strength of the boss 52, compared with the plurality of large diametrical portions 62c in the boss 52 of the disc drive apparatus 50A according to the first embodiment in which the plurality of large diametrical portions 62c open in the projecting end surface of the boss 52 and further penetrate up to the outer circumferential surface thereof.

In a method of manufacturing the disc drive apparatus 50D of the fourth embodiment as described above, when the rotation center hole 62 of the boss 58 of the turntable 52 is fit on the area of the outer circumference surface of the rotary shaft 54, the area being to be inserted and fixed in the rotation center hole 62, the predetermined amount of adhesive 64, which has being applied on the area of the outer circumferential surface of the rotary shaft 54, flows into the clearance 62b of the rotation center hole 62 and escapes out the air in the clearance 62b to the outside space from the openings of the plurality of large diametrical portions 622c in the outer circumferential surface of the boss 58 through the plurality of large diametrical portions 612c, and is filled in the clearance 62b with no residual air. Further, the adhesive 64 flowing into the plurality of large diametrical portions 622c from the clearance 62b escapes out the air in the plurality of large diametrical portions 622c to the outside space from the openings of the plurality of large diametrical portions 622c in the outer circumferential surface of the boss 58, and is further filled in the plurality of large diametrical portions 622c with no residual air.

After the fitting of the rotation center hole 62 of the boss 58 of the turntable 52 to the aforementioned area of the outer circumferential surface of the rotary shaft 54, a part of the adhesive 64 remains on the outer circumferential surface of the rotary shaft 54 and/or a part of the adhesive 64 overflows to the outside from the openings of the plurality of large diametrical portions 622c and the clearance 62b in the outer circumferential surface of the boss 58. These remained and/or overflowed adhesive 64 can be removed by pressing a not-shown and known residual adhesive removing member or by blowing not-shown and known residual adhesive removing gas to the outer circumferential surface of the boss 58 and an area of the outer circumferential surface of the rotary shaft 54, the area being adjacent to the projecting end surface of the boss 58, while the turntable 52 is being rotated together with the rotary shaft 54.

In the disc drive apparatus 50D of the fourth embodiment, each of the plurality of large diametrical portions 622c opens only in the outer circumferential surface of the boss 58. Therefore, when the UV-curing adhesive is used as the adhesive 64 in the disc drive apparatus 50D of the fourth embodiment, as in the case of the aforementioned first embodiment, the ultraviolet radiation device 70 (refer to FIG. 2D) can radiate the ultraviolet ray 72 toward the outer circumferential surface of the boss 58 from the outside space in the radial direction of the boss 58, and the ultraviolet ray 72 can be easily penetrated into the adhesive 64 filled in the plurality of large diametrical portions 622c and the clearance 62b in the boss 58 through the openings of the plurality of large diametrical portions 622c in the outer circumferential surface of the boss 58, and the adhesive 64 filled in the plurality of large diametrical portions 622c and the clearance 62b in the boss 58 can be quickly cured or hardened.

Further, since each of the plurality of large diametrical portions 622c increases its cross section, for example conically, while each large diametrical portion 622c expands outward from the inner circumferential surface of the clearance 62b to the outer circumferential surface of the boss 58 in the radial direction of the rotation center hole 62, the penetration of ultraviolet ray 72 into the adhesive 64 filled in the plurality of large diametrical portions 622c and the clearance 62b in the boss 58 through the openings of the plurality of large diametrical portions 622c in the outer circumferential surface of the boss 58 can be made more easily, and the quick curing or bonding of the adhesive 64 filled in the plurality of large diametrical portions 622c and the clearance 62b in the boss 58 can be accelerated.

And, also, in the disc drive apparatus 50D of the fourth embodiment, as in the disc drive apparatus 50A of the aforementioned first embodiment, it is possible to use the turntable-seating member 66 (refer to FIG. 1A) contacting the projecting end surface of the boss 58.

Of course, in this embodiment, it is possible to use the ordinary adhesive or quick bonding adhesive as the adhesive 64, instead of the UV-curing adhesive.

According to the aspect of the present invention, the large diametrical portion is not limited to the configuration of each of those 62c, 602c, 612c and 622c in the disc drive apparatus 50A, 50B, 50C and 50D of the first to fourth embodiments described with reference to the drawings attached to this specification.

The large diametrical portion according to the aspect of the present invention, not limited to those in the above-mentioned embodiments, may be modified in accordance with requirements, such as the strength and dimensional accuracy required for the turntable, the kind of adhesive, and functions required for manufacturing the disc drive apparatus (e.g., a function for escaping the air in the clearance to the outside space by the adhesive filling into the clearance, and a function for penetrating the UV radiation into the adhesive, required when the UV-curing adhesive is used as the adhesive).

When each of the disc drive apparatuses 50A, 50B, 50C and 50D of the above-mentioned first to fourth embodiments of the present invention is built in a disc-like optical recording medium pickup apparatus, which reproduces information already recorded in a not-shown recording layer of the disc-like optical recording medium 60, such as a DVD or a CD, each of the disc drive apparatuses 50A, 50B, 50C and 50D of the first to fourth embodiments is further combined with the following various units.

The above-mentioned various units include a signal pick-up unit 80 and an information reproduction unit 82, as representatively shown in FIG. 1A showing the disc drive apparatus 50A of the first embodiment. The signal pick-up unit 80 picks up signals recorded in the signal-recording layer of the disc-like optical recording medium 60 by a light beam, such as a laser beam, for example, while the disc-like optical recording medium 60 supported on the another side surface of the turntable 56 is being rotated at a predetermined speed together with the turntable 56 by the rotating force from the rotary shaft 54 of the motor 56. And, the information reproduction unit 82 reproduces the information from the signals picked up by the signal pick-up unit 80.

And, in a case that the signal-recording layer of the disc-like optical recording medium 60 is so configured that signals can be recorded thereon also by the light beam, such as the laser beam, for example, the signal pick-up unit 80 is further combined with a signal-recording unit which records signals in the signal-recording layer of the disc-like optical recording medium 60 by the optical beam, such as the laser beam, for example, as representatively shown in FIG. 1A showing the disc drive apparatus 50A of the first embodiment.

Additional advantages and modifications will readily occur to those skilled in the art. Therefore, the invention in its broader aspect is not limited to the specific details and representative embodiments shown and described herein. Accordingly, various modifications may be made without departing from the spirit or scope of the general inventive concept as defined by the appended claims and their equivalents.

What is claimed is:

1. A disc drive apparatus comprising:
a turntable which includes one side surface, another side surface, and a boss provided concentrically on the one side surface, the boss having a rotation center hole, and the another side surface configured to support a disc-like medium concentrically; and
a rotary shaft which is inserted and fixed in the rotation center hole of the turntable, and rotates the turntable,
wherein, an area of an inner circumferential surface of the rotation center hole of the boss, which is located near to the another side surface of the turntable, is configured as a fitting portion to which a portion of an outer circumferential surface of the rotary shaft, which corresponds to the another side area of the inner circumferential surface of the rotation center hole when the rotary shaft is inserted in the rotation center hole, is pressed to fit;
an area of the inner circumferential surface of the rotation center hole of the boss, which is located near to the one side surface of the turntable, is configured to create a clearance which is detached outward from a portion of the outer circumferential surface of the rotary shaft, which corresponds to the one side area of the inner circumferential surface of the rotation center hole when the rotary shaft is inserted in the rotation center hole, in a radial direction of the rotation center hole by a predetermined distance, the clearance being continued in a circumferential direction of the rotation center hole along the one side portion of the outer circumference surface;
a large diametrical portion is formed in at least one part of the one side area of the inner circumferential surface of the rotation center hole, the large diametrical portion being expanded more outward in the radial direction of the rotation center hole than the clearance and opened to an outside space; and
an adhesive is filled in the clearance and the large diametrical portion.

2. A disc drive apparatus according to claim 1, wherein the boss has a projecting end surface projecting in a direction directing away from the one end surface of the turntable, and an outer circumferential surface facing outward in the radial direction; and
the large diametrical portion penetrates up to the outer circumferential surface of the boss and opens in the projecting end surface.

3. A disc drive apparatus according to claim 2, further comprising a turntable-seating member which is provided on the rotary shaft, faces the projecting end surface of the boss, and closes the openings of the large diametrical portion and of the clearance in the projecting end surface when the rotation center hole of the boss of the turntable is fixed to the rotary shaft.

4. A disc drive apparatus according to claim 1, wherein the boss has a projecting end surface projecting in a direction directing away from the one end surface of the turntable, and an outer circumferential surface facing outward in the radial direction;
the large diametrical portion opens only in the projecting end surface of the boss; and
a part of the boss, located between an outer end of the large diametrical portion in the radial direction and the outer circumferential surface of the boss, continues in the circumferential direction.

5. A disc drive apparatus according to claim 1, wherein the boss has an outer circumferential surface facing outward in the radial direction of the turntable; and
the large diametrical portion opens only in the outer circumferential surface of the boss.

6. A disc drive apparatus according to claim 1, wherein the boss has a projecting end surface projecting in a direction directing away from the one end surface of the turntable; and
the disk drive apparatus further comprises a turntable-seating member, which is provided on the rotary shaft and faces the projecting end surface of the boss when the rotation center hole of the boss of the turntable is fixed to the rotary shaft.

7. A disc drive apparatus according to claim 1, wherein the boss includes a plurality of large diametrical portions; and
the plurality of large diametrical portions are provided at a plurality of positions separated at equal intervals in the circumferential direction in the one side area of the inner circumference surface.

8. A disc drive apparatus according to claim 1, wherein the disc-like medium is a disc-like optical recording medium having a signal-recording layer; and
the disc drive apparatus further comprises a disc-like optical recording medium rotation unit which includes the turntable and the rotary shaft;
a signal pick-up unit which picks up signals recorded in the signal-recording layer of the disc-like optical recording medium, using a light beam, while the disc-like optical recording medium supported on the another side surface of the turntable of the disc-like optical recording medium rotation unit is rotated; and
an information reproduction unit, which reproduces information corresponding to the signal picked up by the signal pick-up unit from the signal-recording layer of the disc-like optical recording medium.

9. A disc drive apparatus according to claim 8, wherein signals can be recorded in the signal-recording layer of the disc-like optical recording medium, using the light beam; and
the disc drive apparatus further comprises a signal-recording unit, which records signals in the signal-recording layer of the disc-like optical recording medium, using the light beam.

10. A disc drive apparatus according to claim 8, wherein the disc-like optical recording medium is a digital versatile disc.

11. A disc drive apparatus according to claim 8, wherein the boss has a projecting end surface projecting in a direction directing away from the one side surface of the turntable, and an outer circumferential surface facing outward in the radial direction; and
the large diametrical portion penetrates up to the outer circumferential surface of the boss and opens in the projecting end surface.

12. A disc drive apparatus according to claim 11, further comprising a turntable-seating member which is provided on the rotary shaft, faces the projecting end surface of the boss, and closes the openings of the large diametrical portion and of the clearance in the projecting end surface when the rotation center hole of the boss of the turntable is fixed to the rotary shaft.

13. A disc drive apparatus according to claim 8, wherein the boss has a projecting end surface projecting in a direction directing away from the one side surface of the turntable, and an outer circumferential surface facing outward in the radial direction;

the large diametrical portion opens only in the projecting end surface of the boss; and a part of the boss, located between an outer end of the large diametrical portion in the radial direction and the outer circumferential surface of the boss, continues in the circumferential direction.

14. A disc drive apparatus according to claim 8, wherein the boss has an outer circumferential surface facing outward in the radial direction of the turntable; and the large diametrical portion opens only in the outer circumferential surface of the boss.

15. A disc drive apparatus according to claim 8, wherein the boss has a projecting end surface projecting in a direction directing away from the one side surface of the turntable; and the disk drive apparatus further comprises a turntable-seating member, which is provided on the rotary shaft and faces the projecting end surface of the boss when the rotation center hole of the boss of the turntable is fixed to the rotary shaft.

16. A disc drive apparatus according to claim 8, wherein the boss includes a plurality of large diametrical portions; and the plurality of large diametrical portions are provided at a plurality of positions separated at equal intervals in the circumferential direction in the one side area of the inner circumference surface.

17. A method of manufacturing a disc drive apparatus, the disc drive apparatus comprising a turntable which includes one side surface, another side surface, and a boss provided concentrically on the one side surface, the boss having a rotation center hole, and the another side surface configured to support a disc-like medium concentrically; and a rotary shaft which is inserted and fixed in the rotation center hole of the turntable, and rotates the turntable, wherein, an area of an inner circumferential surface of the rotation center hole of the boss, which is located near to the another side surface of the turntable, is configured as a fitting portion to which a portion of an outer circumferential surface of the rotary shaft, which corresponds to the another side area of the inner circumferential surface of the rotation center hole when the rotary shaft is inserted in the rotation center hole, is pressed to fit;

an area of the inner circumferential surface of the rotation center hole of the boss, which is located near to the one side surface of the turntable, is configured to create a clearance which is detached outward from a portion of the outer circumferential surface of the rotary shaft, which corresponds to the one side area of the inner circumferential surface of the rotation center hole when the rotary shaft is inserted in the rotation center hole, in a radial direction of the rotation center hole by a predetermined distance, the clearance being continued in a circumferential direction of the rotation center hole along the one side portion of the outer circumference surface; and a large diametrical portion is formed in at least one part of the one side area of the inner circumferential surface of the rotation center hole, the large diametrical portion being expanded more outward in a radial direction of the rotation center hole than the clearance and opened to an outside space, the method comprising:

applying an adhesive to an area of the outer circumferential surface of the rotary shaft, the area being to be inserted and fixed in the rotation center hole of the boss of the turntable; and inserting the area of the rotary shaft to be inserted and fixed into the rotation center hole of the boss of the turntable, wherein, the adhesive applied to the area of the rotary shaft to be inserted and fixed is pressed by a boundary between the fitting portion and the clearance in the inner circumferential surface of the rotation center hole of the boss, when the area of the rotary shaft to be inserted and fixed is inserted into the rotation center hole of the boss of the turntable;

the pressed adhesive escapes air in the clearance to an outside space from the large diametrical portion, spreads to the whole of the clearance, and fills the whole of the clearance;

the adhesive spreading in the clearance flows from the clearance into the large diametrical portion, and fills the large diametrical portion; and after the insertion of the rotary shaft into the rotation center hole of the boss, the rotary shaft is fit in the fitting part of the inner circumferential surface of the rotation center hole of the boss of the turntable, and the clearance and large diametrical portion of the inner circumferential surface of the rotation center hole is bonded to the rotary shaft by the adhesive filled in the clearance and large diametrical portion.

18. A method of manufacturing a disk drive apparatus according to claim 17, further comprising:

fixing a turntable-seating member to an end of the area of the outer circumferential surface of the rotary shaft, the area being to be inserted and fixed in the rotation center hole of the boss, and the end being located opposite to a projecting end of the rotary shaft, before applying the adhesive to the area of the outer circumferential surface of the rotary shaft, wherein, the boss has an projecting end surface projecting in a direction directing away from the one side surface of the turntable;

the large diametrical portion opens in the projecting end surface of the boss; and the turntable-seating member closes the openings of the clearance and of the large diametrical portion in the projecting end surface, and is bonded to the adhesive exposed in the openings, after inserting the rotary shaft in the rotation center hole of the boss of the turntable.

19. A method of manufacturing a disk drive apparatus according to claim 18, wherein the boss has an outer circumferential surface facing outward in the radial direction; and the large diametrical portion penetrates up to the outer circumferential surface of the boss.

20. A method of manufacturing a disk drive apparatus according to claim 17, wherein the adhesive is at least one of a quick bonding adhesive and ultraviolet-curing adhesive.

* * * * *